US012057590B1

(12) United States Patent
Liang et al.

(10) Patent No.: US 12,057,590 B1
(45) Date of Patent: Aug. 6, 2024

(54) END COVER ASSEMBLY, ENERGY STORAGE APPARATUS, AND ELECTRICITY-CONSUMPTION DEVICE

(71) Applicants: Shenzhen Hithium Energy Storage Technology Co., Ltd., Guangdong (CN); Xiamen Hithium Energy Storage Technology Co., Ltd., Fujian (CN)

(72) Inventors: Jinyun Liang, Guangdong (CN); Feng Wang, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/525,461

(22) Filed: Nov. 30, 2023

(30) Foreign Application Priority Data

Feb. 9, 2023 (CN) .......................... 202310091084.3

(51) Int. Cl.
*H01M 50/148* (2021.01)
*H01M 50/186* (2021.01)
*H01M 50/552* (2021.01)

(52) U.S. Cl.
CPC ....... *H01M 50/186* (2021.01); *H01M 50/148* (2021.01); *H01M 50/552* (2021.01)

(58) Field of Classification Search
CPC . H01M 50/186; H01M 50/552; H01M 50/148
See application file for complete search history.

(56) References Cited

FOREIGN PATENT DOCUMENTS

| CN | 101587965 A | 11/2009 |
|---|---|---|
| CN | 208986033 U | 6/2019 |
| CN | 110021728 A | 7/2019 |
| CN | 110379953 A | 10/2019 |
| CN | 209747563 U | 12/2019 |
| CN | 210272526 U | 4/2020 |
| CN | 213401337 U | 6/2021 |
| CN | 113178651 A | 7/2021 |
| CN | 113270667 A | 8/2021 |
| CN | 215266471 U | 12/2021 |

(Continued)

OTHER PUBLICATIONS

CN215451569A translation (Year: 2022).*

(Continued)

*Primary Examiner* — Jane J Rhee
(74) *Attorney, Agent, or Firm* — IP Spring

(57) ABSTRACT

An end cover assembly, an energy storage apparatus, and an electricity-consumption device are provided in the disclosure. The end cover assembly includes a top cover, a lower plastic member, a sealing member, and a terminal post. The lower plastic member is fixed to the top cover and defines a hollow hole and a first flow passage. The hollow hole extends through the lower plastic member in a direction from the lower plastic member to the top cover. One end of the first flow passage is in communication with a side wall of the hollow hole, and another end of the first flow passage is in communication with an outside. The sealing member includes a first sealing portion disposed in the hollow hole. The terminal post has a flange portion.

20 Claims, 9 Drawing Sheets

(56) References Cited

FOREIGN PATENT DOCUMENTS

| | | |
|---|---|---|
| CN | 215451569 U | 1/2022 |
| CN | 215869708 U | 2/2022 |
| CN | 215896540 U | 2/2022 |
| CN | 217361751 U | 9/2022 |
| CN | 217507473 U | 9/2022 |
| CN | 217848117 U | 11/2022 |
| CN | 218039478 U | 12/2022 |
| CN | 218039495 U | 12/2022 |
| DE | 102017216874 A1 | 3/2019 |

OTHER PUBLICATIONS

WIPO, International Search Report and Written Opinion for International Patent Application No. PCT/CN2023/075291, Jun. 21, 2023., 14 pages.
CNIPA, First Office Action for corresponding Chinese Patent Application No. 202310091084.3, Mar. 24, 2023, 18 pages.
CNIPA, Notification to Grant Patent Right for Invention for corresponding Chinese Patent Application No. 202310091084.3, Apr. 15, 2023, 9 pages.

\* cited by examiner

US 12,057,590 B1

END COVER ASSEMBLY, ENERGY STORAGE APPARATUS, AND ELECTRICITY-CONSUMPTION DEVICE

CROSS-REFERENCE TO RELATED APPLICATION(S)

This application claims priority under 35 U.S.C. § 119(a) to Chinese Patent Application No. 202310091084.3, filed Feb. 9, 2023, the entire disclosure of which is incorporated herein by reference.

TECHNICAL FIELD

The disclosure relates to the field of energy storage technologies, and in particular, to an end cover assembly, an energy storage apparatus, and an electricity-consumption device.

BACKGROUND

Currently, a secondary battery typically includes an electrode assembly, and a housing and an end cover assembly that accommodate the electrode assembly. The end cover assembly and the housing form a sealing structure. The end cover assembly generally includes a top cover, a positive post body, and a negative post body. The top cover defines through holes. The positive post body and the negative post body extend through the through holes, respectively. The electrode assembly is configured to deliver electric energy outsides through the positive post body and the negative post body. However, there is an electrolyte inside the secondary battery, and electrolyte leakage may easily occur after long-term use of the secondary battery.

SUMMARY

An end cover assembly, an energy storage apparatus, and an electricity-consumption device are provided in the disclosure and have a good sealing effect.

In a first aspect, an end cover assembly is provided. The end cover assembly includes a top cover, a lower plastic member, a sealing member, and a terminal post. The lower plastic member is fixed to the top cover and defines a hollow hole and a first flow passage. The hollow hole extends through the lower plastic member in a direction from the lower plastic member to the top cover. One end of the first flow passage is in communication with the hollow hole, and another end of the first flow passage is in communication with an outside. The sealing member includes a first sealing portion disposed in the hollow hole. The terminal post has a flange portion. The flange portion is disposed on one side of the first sealing portion facing away from the top cover and covers the first sealing portion. The flange portion and the top cover cooperatively compress the first sealing portion. The flange portion is insulated and separated from the top cover by the lower plastic member.

In a second aspect, an energy storage apparatus is further provided. The energy storage apparatus includes an electrode assembly, a housing, and the end cover assembly. The electrode assembly is received in the housing, and the end cover assembly is electrically connected to the electrode assembly.

In a third aspect, an electricity-consumption device is further provided. The electricity-consumption device includes the energy storage apparatus. The energy storage apparatus is configured to power the electricity-consumption device.

BRIEF DESCRIPTION OF THE DRAWINGS

In order to describe technical solutions in embodiments of the disclosure more clearly, the accompanying drawings for describing embodiments are briefly introduced below. The accompanying drawings in the following illustration are merely some embodiments of the disclosure. Those of ordinary skill in the art may also obtain other drawings based on these accompanying drawings without creative efforts.

DETAILED DESCRIPTION

The technical solutions in the embodiments of the disclosure are clearly and completely described in the following with reference to the accompanying drawings in the embodiments of the disclosure. The described embodiments are merely part of rather than all of the embodiments of the disclosure. All other embodiments obtained by those of ordinary skill in the art based on the embodiments of the disclosure are within the scope of the disclosure.

Reference herein to terms "embodiment" or "example" means that specific features, structures, or characteristics described in combination with the embodiments or examples may be included in at least one embodiment or example of the disclosure. The above terms at various positions of the specification do not necessarily refer to the same embodiment or example, nor to separate or alternative embodiments mutually exclusive of other embodiments. It is apparent and implicitly understood by those of skill in the art that the embodiments described herein may be combined with other embodiments.

Figure 1:
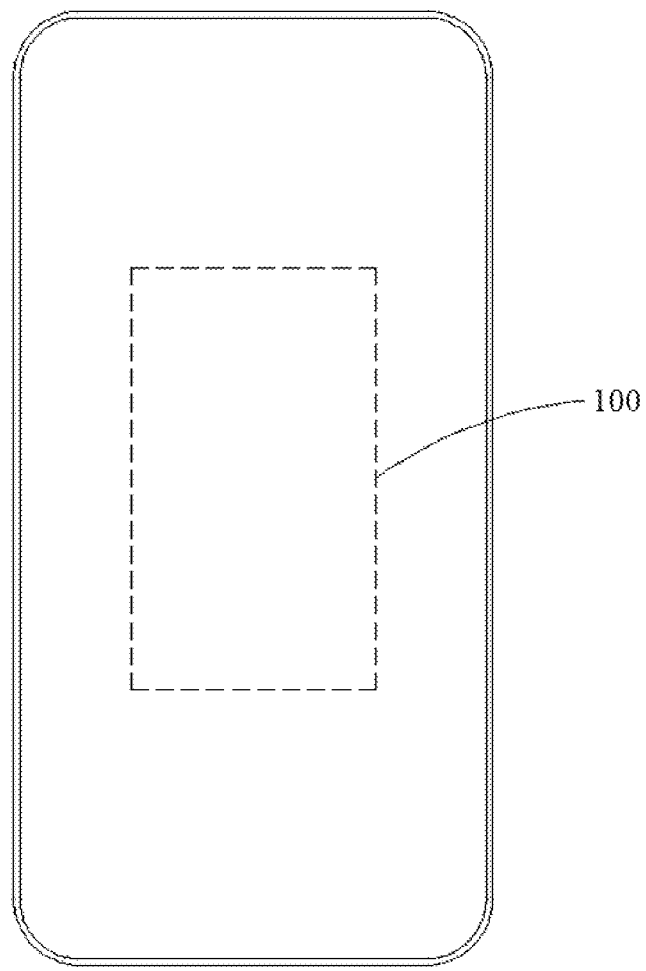
FIG. 1 is a schematic diagram of an electricity-consumption device according to embodiments of the disclosure.

As illustrated in FIG. 1, an electricity-consumption device 1 is provided in the disclosure. The electricity-consumption device 1 includes an energy storage apparatus 100 described in the following embodiments. The energy storage apparatus 100 is configured to power the electricity-consumption device 1. The electricity-consumption device 1 may be, but is not limited to, a vehicle, an intelligent electronic device (such as a mobile phone or a computer), and the like.

Figure 2:
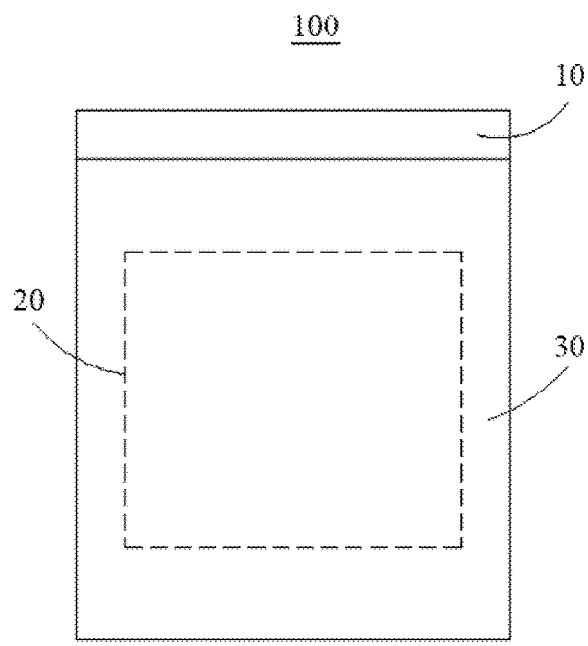
FIG. 2 is a schematic diagram of an energy storage apparatus according to embodiments of the disclosure.
Figure 3:
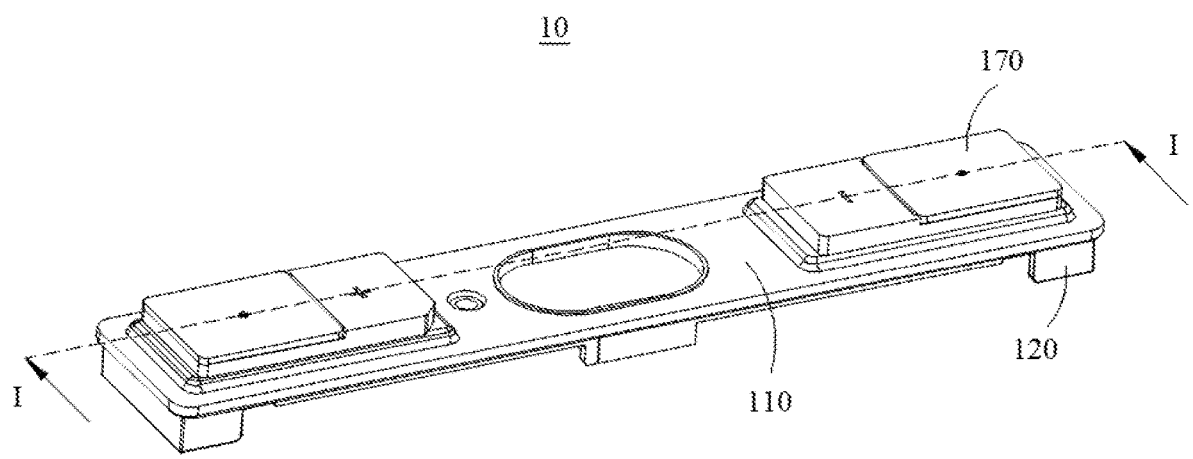
FIG. 3 is a schematic view of an end cover assembly according to embodiments of the disclosure.
Figure 4:
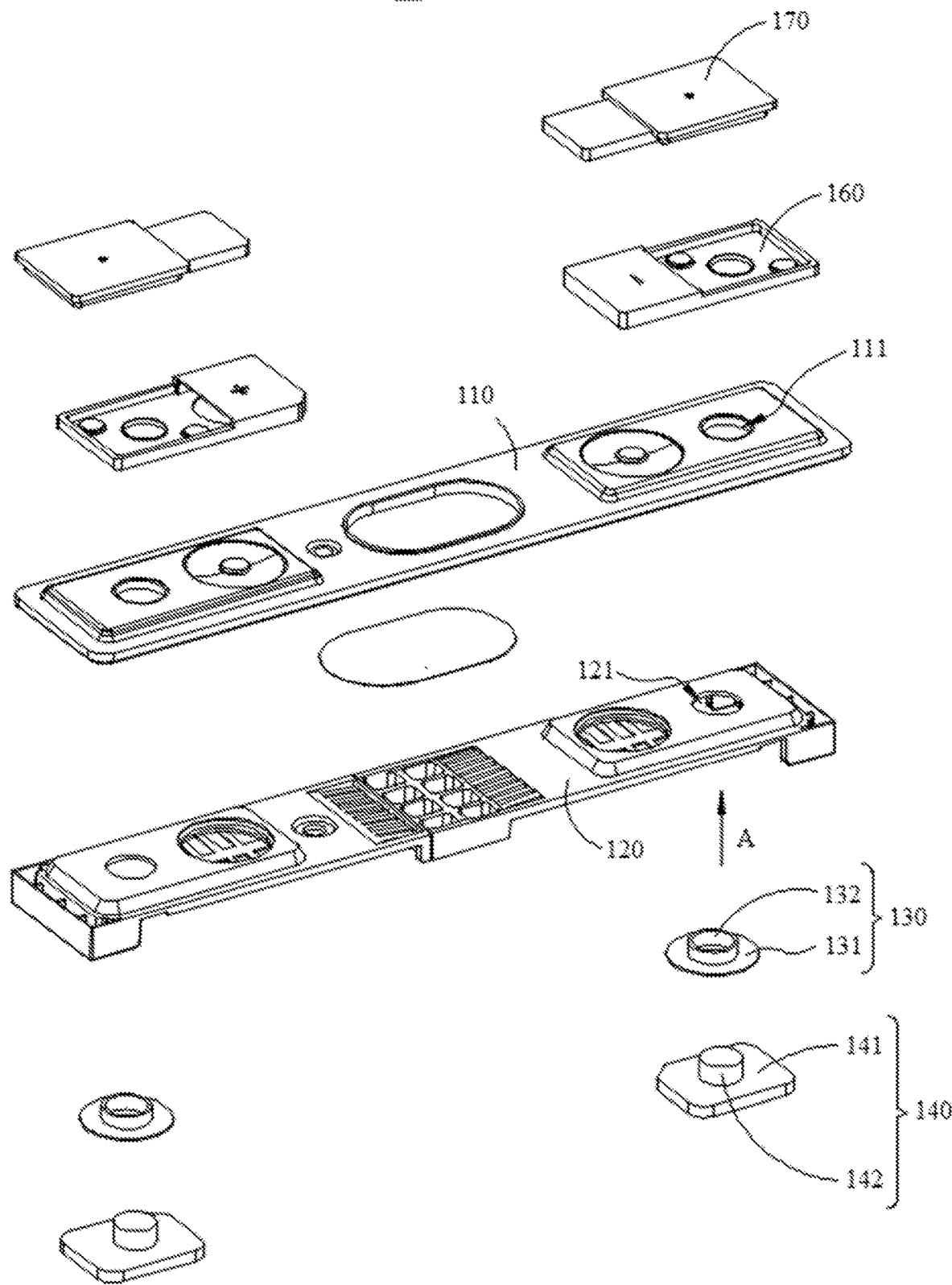
FIG. 4 is an exploded view of the end cover assembly in FIG. 3.

As illustrated in FIG. 2, the energy storage apparatus 100 is further provided in the disclosure. The energy storage apparatus 100 includes an electrode assembly 20, a housing 30, and an end cover assembly 10. The electrode assembly 20 is disposed in the housing 30. The end cover assembly 10 is electrically connected to the electrode assembly 20. The electrode assembly 20 is configured to deliver electric energy outwards through the end cover assembly 10. The housing 30 is further provided with an electrolyte. The electrode assembly 20 is soaked in the electrolyte. The energy storage apparatus 100 may be a battery or a battery pack. The battery pack includes a box body and multiple batteries (greater than or equal to two batteries). The multiple batteries are received in the box body. The multiple batteries are electrically connected to one another. A shape of the energy storage apparatus 100 may be, but is not limited to, a cylindrical shape, a cuboid shape, a cube shape, etc. The energy storage apparatus 100 may be applied in, but is not limited to, fields such as household energy storage, large-scale industry and commerce, 5G base stations, micro-grids, integrated optical storage and charging, and virtual power plants.

As illustrated in FIGS. 3 to 7, the end cover assembly 10 is further provided in the disclosure. The end cover assembly 10 includes a top cover 110, a lower plastic member 120, a sealing member 130, and a terminal post 140. The above components will be described in detail below with reference to the accompanying drawings.

The top cover 110 may also be referred to as a smooth aluminum sheet, a top cover, a cover plate, and the like. The top cover 110 is generally made of a conductive material. In terms of structure, the top cover 110 is insulated from the terminal post 140.

Figure 5:
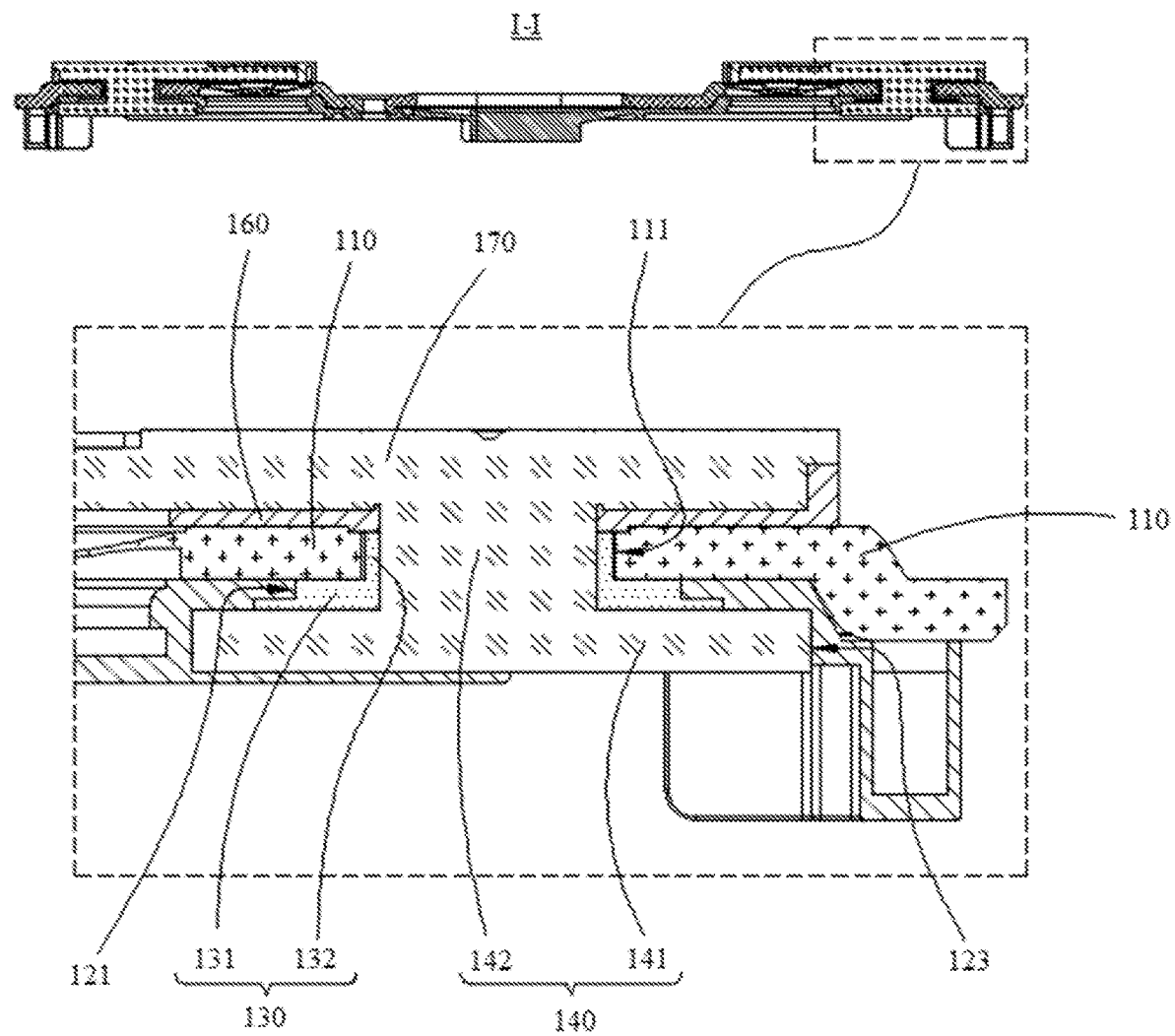
FIG. 5 is a cross-sectional view of the end cover assembly in FIG. 3, taken along line i-i.
Figure 6:
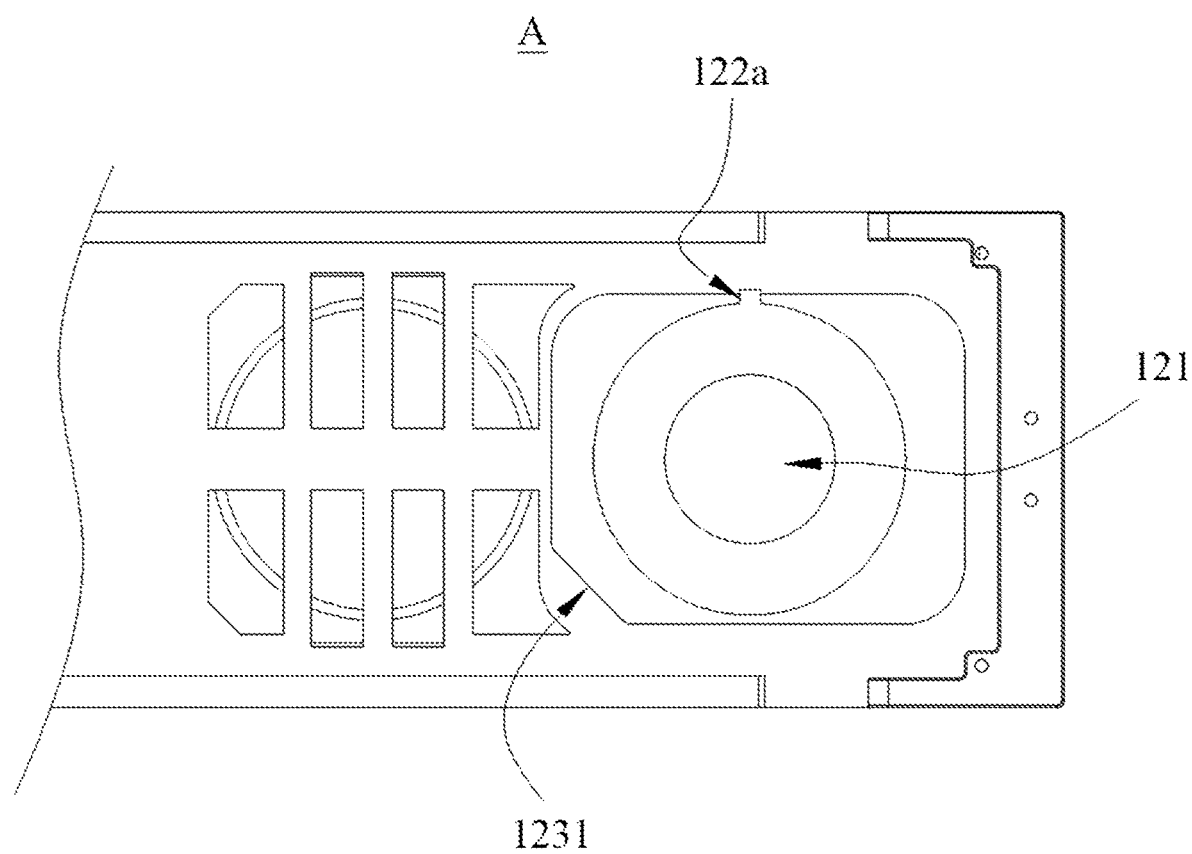
FIG. 6 is a partial schematic view of a top cover in FIG. 4, viewed from direction A.
Figure 7:
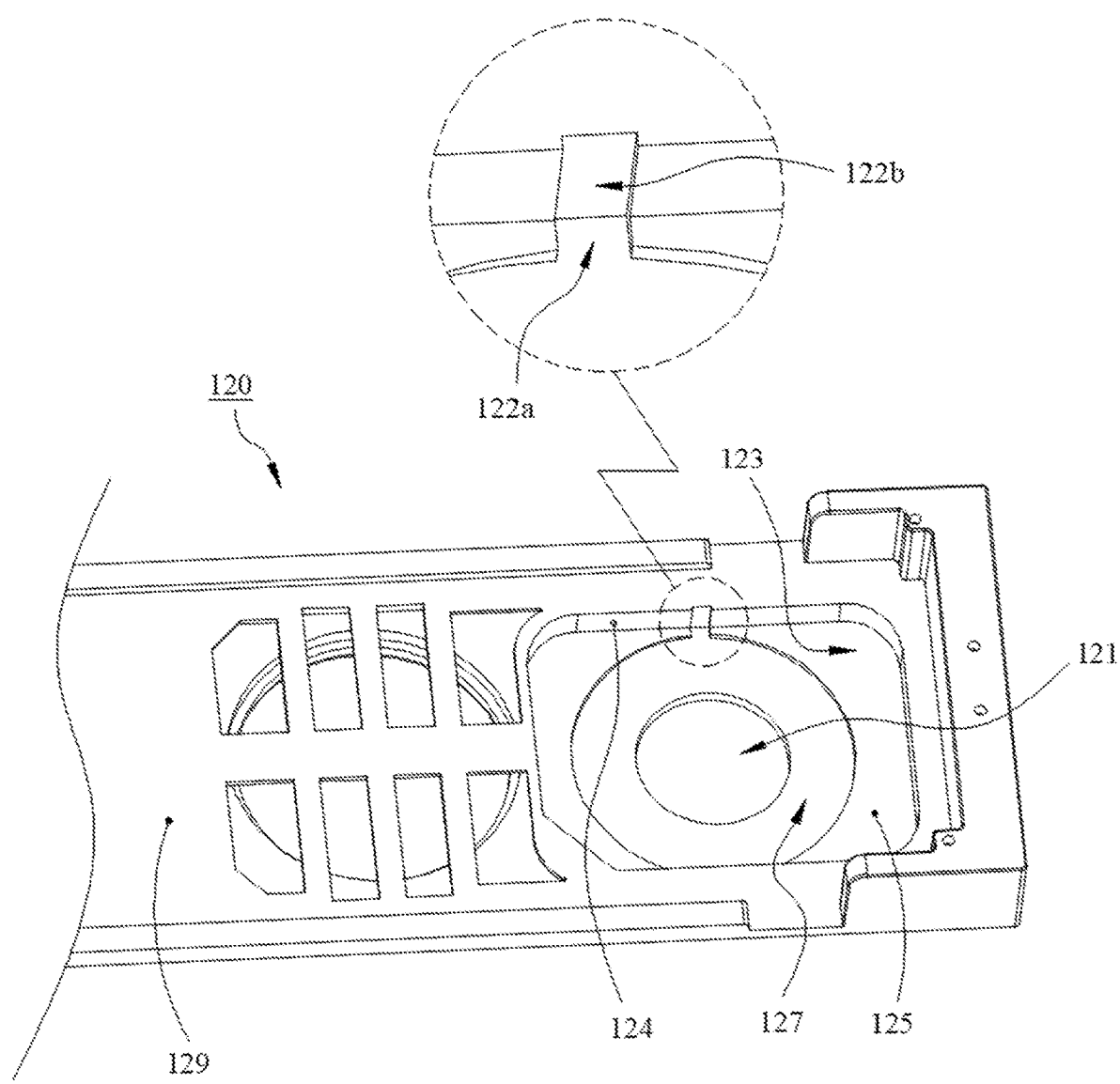
FIG. 7 is a schematic view of the top cover in FIG. 6, viewed from in another direction.

The lower plastic member 120 is fixed to the top cover 110. The lower plastic member 120 is made of an insulating material. The lower plastic member 120 may be made of a plastic material. In other embodiments, the lower plastic member 120 may also be made of a non-plastic material. The lower plastic member 120 defines a hollow hole 121 and a first flow passage 122a (as illustrated in FIG. 5 to FIG. 7). The hollow hole 121 extends through the lower plastic member 120 in a direction from the lower plastic member 120 to the top cover 110. That is, the hollow hole 121 is a through hole extending through the lower plastic member 120. Because the hollow hole 121 is a through hole, part of the top cover 110 facing the hollow hole 121 is exposed. The first flow passage 122a extends from the hollow hole 121 to an outside of the lower plastic member 120. That is, one end of the first flow passage 122a is in communication with a side wall of the hollow hole 121, and another end of the first flow passage 122a is in communication with an outside. A recess in communication with the hollow hole 121 is defined at an edge of the hollow hole 121 to form the first flow passage 122a. That is, the recess serves as the first flow passage 122a.

In the disclosure, the outside refers to a space outside the end cover assembly 10. During assembly of the end cover assembly 10, air in a gap between the first sealing portion 131 and the side wall of the hollow hole 121 can be expelled to the space outside the end cover assembly 10 through the first flow passage 122a, thereby achieving an enhanced sealing effect of the sealing member 130.

The sealing member 130 includes a first sealing portion 131 (as illustrated in FIG. 5) disposed in the hollow hole 121. The sealing member 130 may be made of an elastic and insulating material, such as rubber.

The terminal post 140 includes a flange portion 141 (as illustrated in FIG. 5). The flange portion 141 is disposed on one side of the first sealing portion 131 facing away from the top cover 110 and covers the first sealing portion 131. The flange portion 141 and the top cover 110 cooperatively compress the first sealing portion 131. In other words, since the first sealing portion 131 is positioned in the hollow hole 121, the first sealing portion 131 is positioned between the flange portion 141 and the top cover 110. Therefore, the flange portion 141 and the top cover 110 cooperatively compress the first sealing portion 131, so that the first sealing portion 131 can seal a gap between the flange portion 141 and the top cover 110. In addition, the flange portion 141 is insulated and separated from the top cover 110 by the lower plastic member 120. That is, the flange portion 141 and the top cover 110 are disposed on two opposite sides of the lower plastic member 120, respectively. The lower plastic member 120 is configured to insulate and separate the flange portion 141 from the top cover 110. It may be noted that, the terminal post 140 in the disclosure may be a positive terminal post or a negative terminal post of the energy storage apparatus 100, which is not limited herein.

As illustrated in FIG. 5, the end cover assembly 10 further includes a metal block 170 and an upper plastic member 160. The metal block 170 is disposed at one side of the top cover 110 facing away from the lower plastic member 120. The upper plastic member 160 is at least partially positioned between the metal block 170 and the top cover 110. The upper plastic member 160 is configured to insulate and separate the metal block 170 from the top cover 110. The upper plastic member 160 may be made of, but is not limited to, a plastic material. In some embodiments, when the lower plastic member 120 and the upper plastic member 160 are both made of plastic, the lower plastic member 120 may also be referred to as a lower plastic, and the upper plastic member 160 may also be referred to as an upper plastic.

As illustrated in FIG. 5, the top cover 110 defines a through hole 111, and the through hole 111 faces the hollow hole 121. The terminal post 140 further includes a post body 142 protruding from one side of the flange portion 141. One end of the post body 142 facing away from the flange portion 141 extends through the hollow hole 121 and is electrically connected to the metal block 170. In the energy storage apparatus 100, the electrode assembly 20 is electrically connected to the flange portion 141 directly or indirectly. When the energy storage apparatus 100 outputs electric energy to the outside, the electric energy is output through the flange portion 141, the post body 142, and the metal block 170 in sequence.

Because the top cover 110 defines the through hole 111, it is required to prevent the electrolyte in the energy storage apparatus 100 from leaking to the outside through the through hole 111, or prevent external impurities from entering the interior of the energy storage apparatus 100 through the through hole 111 and contaminating the electrolyte. In the disclosure, the first sealing portion 131 of the sealing member 130 is disposed between the flange portion 141 and the top cover 110, so that a passage of the energy storage apparatus 100 in the vicinity of the through hole 111 can be blocked, thereby avoiding or weakening the described problem.

It may be noted that, during assembly of the end cover assembly 10 provided in the disclosure, the metal block 170, the top cover 110, and the lower plastic member 120 may be first stacked together, then the terminal post 140 is attached to the lower plastic member 120, and finally, one end of the post body 142 of the terminal post 140 facing away from the flange portion 141 is connected to the metal block 170. During assembly, the terminal post 140 is moved in a direction from the lower plastic member 120 to the top cover 110.

As illustrated in FIG. 5, a radial size of the through hole 111 is less than a radial size of the hollow hole 121. Because the through hole 111 faces the hollow hole 121, at least part of the top cover 110 will be exposed to face the hollow hole 121, and the first sealing portion 131 disposed in the hollow hole 121 is in contact with part of the top cover 110 that is exposed. That is, the radial size of the through hole 111 is set to be less than the radial size of the hollow hole 121, thereby ensuring that the first sealing portion 131 can be positioned between the top cover 110 and the flange portion 141. Therefore, the top cover 110 and the flange portion 141 can cooperatively compress the first sealing portion 131, thereby ensuring that the first sealing portion 131 can achieve a sealing function.

As illustrated in FIG. 5, the sealing member 130 further includes a second sealing portion 132 protruding from one side of the first sealing portion 131. The second sealing portion 132 has a hollow cylindrical shape. The second sealing portion 132 extends through the through hole 111 and is sleeved on an outer periphery of the post body 142. That is, the second sealing portion 132 is positioned in the through hole 111 and wraps around the outer periphery of the post body 142. The second sealing portion 132 may have at least two beneficial effects as follows. On the one hand, the second sealing portion 132 can seal the through hole 111. On the other hand, the second sealing portion 132 can separate the post body 142 from the top cover 110. It may be understood that the second sealing portion 132 also facilitates mounting of the sealing member 130. During assembly, the second sealing portion 132 can be positioned by the through hole 111, and inserted into the through hole 111, thereby mounting the sealing member 130 while also ensuring that the sealing member 130 is not easily displaced after mounting.

Figure 8:
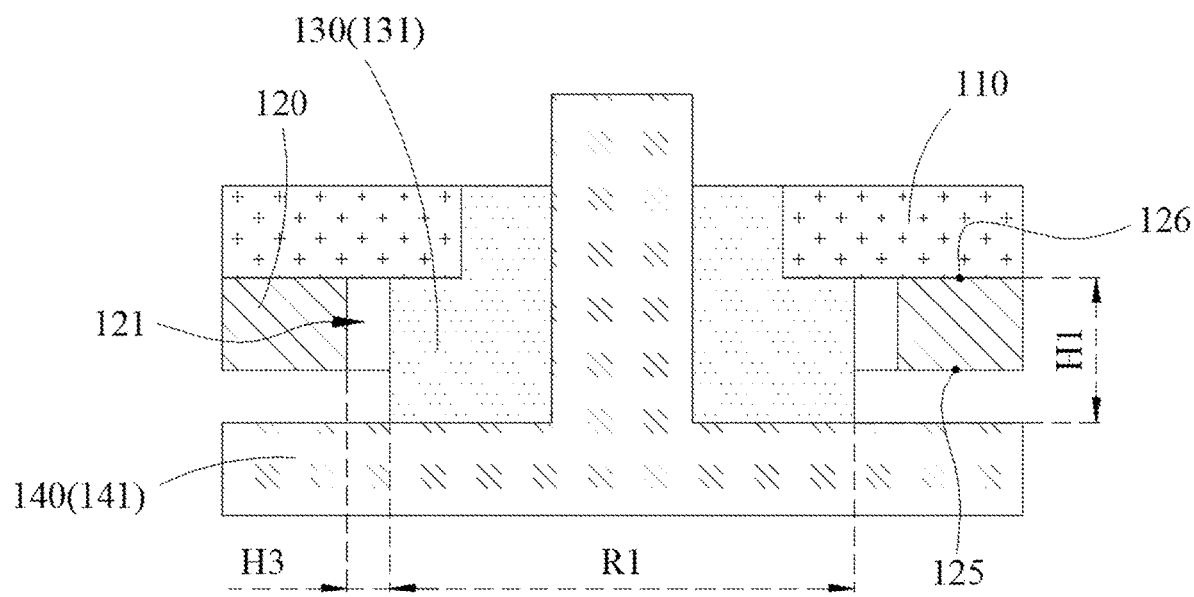
FIG. 8 is a schematic diagram illustrating an end cover assembly in a non-sealed state according to an embodiment of the disclosure.
Figure 9:
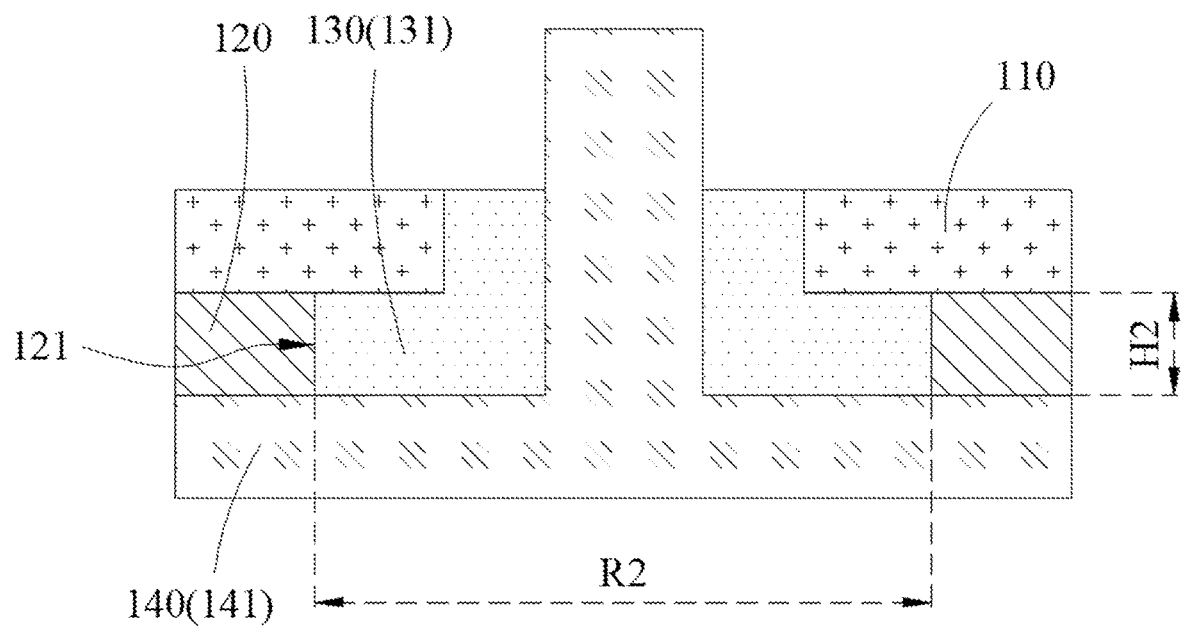
FIG. 9 is a schematic diagram illustrating an end cover assembly in a sealed state according to an embodiment of the disclosure.

Further, the end cover assembly 10 has a sealing state and a non-sealing state. The non-sealing state refers to a state of the end cover assembly 10 before a sealing assembly. The sealing state refers to a state of the end cover assembly 10 after the sealing assembly is completed. When the end cover assembly 10 is in the non-sealing state (as illustrated in FIG. 8), an outer diameter of the first sealing portion 131 is a first size R1, and the first size R1 is less than a diameter of the hollow hole 121. When the end cover assembly 10 is in the sealing state (as illustrated in FIG. 9), an outer diameter of the first sealing portion 131 is a second size R2, and the second size R2 is greater than the first size R1. During switch of the end cover assembly 10 from the non-sealed state to the sealed state, the first flow passage 122a is configured to expel air from the hollow hole 121. The non-sealing state may be understood as a state of the end cover assembly 10 in which the first sealing portion 131 is not compressed by the flange portion 141 and the top cover 110. Accordingly, the sealed state may be understood as a state of the end cover assembly 10 in which the first sealing portion 131 is compressed by the flange portion 141 and the top cover 110.

Specifically, when the first sealing portion 131 is not compressed by the flange portion 141, the radial size of the first sealing portion 131 is less than the inner diameter of the hollow hole 121. In other words, a gap is defined between the outer periphery of the first sealing portion 131 and the side wall of the hollow hole 121. During movement of the flange portion 141 in the direction from the lower plastic member 120 to the top cover 110, the first sealing portion 131 will expand in a radial direction of the first sealing portion 131 under cooperative compression of the flange portion 141 and the top cover 110, thereby reducing the gap between the first sealing portion 131 and the hollow hole 121. It may be understood that, during reduction of the gap, air in the gap needs to be expelled for further compressing the first sealing portion 131. Otherwise, the air in the gap will hinder the first sealing portion 131 from expanding in the radial direction, resulting in poor sealing effect caused by an insufficient compression of the first sealing portion 131 by the flange portion 141. In the disclosure, the first flow passage 122a is defined on the lower plastic member 120, and the first flow passage 122a is in communication with the hollow hole 121 and extends to the outside of the lower plastic member 120. Therefore, during reduction of the gap between the first sealing portion 131 and the hollow hole 121, the air in the gap can be expelled from the first flow passage 122a to the outside of the lower plastic member 120. As a result, the first sealing portion 131 can be compressed continuously by the flange portion 141 to expand in the radial direction. Finally, the first sealing portion 131 can sufficiently seal the gap between the flange portion 141 and the top cover 110.

The sealing member 130 is generally an elastic member. The sealing member 130 is deformed under compression, thereby tightly abutting against a contact surface to achieve a sealing effect. If air is not expelled from the contact surface, air bubbles can easily form during compression to affect mutual abutment between the sealing member 130 and the contact surface, thereby reducing the sealing effect. In the disclosure, during assembly of the end cover assembly 10, an upper surface of the flange portion 141 of the terminal post 140 is moved to abut against the first sealing portion 131 of the sealing member 130 and a lower surface of the lower plastic member 120 (i.e., a surface of the lower plastic member 120 facing towards the flange portion) 141. In this case, air between the lower surface of the lower plastic member 120, a lower surface of the first sealing portion 131, and the upper surface of the flange portion 141, as well as air between an outer peripheral wall of the first sealing portion 131 and an inner peripheral wall of the hollow hole 121, can be expelled through the first flow passage 122a, thereby avoiding formation of air bubbles and enhancing the sealing effect of the sealing member 130.

In conclusion, in the end cover assembly 10 provided in the disclosure, the first flow passage 122a is defined on the lower plastic member 120, and the first flow passage 122a is in communication with the hollow hole 121 and extends to the outside of the lower plastic member 120. During switch of the end cover assembly 10 from the non-sealing state to the sealing state (the radial size of the first sealing portion 131 is increased from the first size R1 to the second size R2), the air between the outer periphery of the first sealing portion 131 and the side wall of the hollow hole 121 can be expelled to the outside of the lower plastic member 120 through the first flow passage 122a. Therefore, during assembly, the flange portion 141 and the top cover 110 may cooperate to smoothly compress the first sealing portion 131, so that the first sealing portion 131 can sufficiently seal the gap between the flange portion 141 and the top cover 110.

As illustrated in FIGS. 5 and 7, the lower plastic member 120 has an end surface 129. The end surface 129 is a surface of the lower plastic member 120 facing away from the top cover 110. The lower plastic member 120 further defines an accommodating recess 123. The accommodating recess 123 is recessed from the end surface 129. The accommodating recess 123 is in communication with the hollow hole 121. The flange portion 141 is received in the accommodating recess 123. It may be understood that, the lower plastic member 120 is mated with the flange portion 141 through the accommodating recess 123, which facilitates stability of the connection between the lower plastic member 120 and the flange portion 141. Furthermore, the flange portion 141 is disposed in the accommodating recess 123, so that the lower plastic member 120 is in interference fitting with the flange portion 141, thereby enhancing the sealing effect. In addition, because the accommodating recess 123 is in communication with the hollow hole 121, during assembly of the flange portion 141 to the accommodating recess 123, air in the accommodating recess 123 may also be expelled through the first flow passage 122a.

As illustrated in FIG. 7, the lower plastic member 120 has a first surface 124. The first surface 124 serves as a side surface of the accommodating recess 123. A second flow passage 122b is defined on the first surface 124. One end of the second flow passage 122b is in communication with the first flow passage 122a, and another end of the second flow passage 122b is in communication with the outside. That is, the second flow passage 122b is recessed from the first surface 124, and the second flow passage 122b extends through the end surface 129. The second flow passage 122b extends through the end surface 129, so that the second flow passage 122b can be used to expel the air in the hollow hole 121 to the outside of the lower plastic member 120. In this embodiment, the second flow passage 122b may be a rectangular recess, an arc-shaped recess, or the like. The number of the second flow passages 122b may be one. Alternatively, the number of the second flow passages 122b may be more than one, for example, two, three, four, or the like. It may be understood that, the larger the number of the second flow passages 122b is, the faster the air is expelled, which facilitates quick assembly of the flange portion 141 and improves production efficiency.

Optionally, the first flow passage 122a is curvedly connected to the second flow passage 122b. That is, a junction between the first flow passage 122a and the second flow passage 122b is curved. This arrangement can prevent an airflow, flowing from the first flow passage 122a to the second flow passage 122b, from hitting against the bottom of the second flow passage 122b to form a backflow when flowing through the junction between the first flow passage 122a and the second flow passage 122b. That is, the curved junction may play a role in guiding airflow, thereby improving capacity of air expelling.

Optionally, a width of the first flow passage 122a (i.e., a width of a recess of the first flow passage 122a) ranges from 0.6 mm to 2.4 mm, and a width of the second flow passage 122b (i.e., a width of a recess of the second flow passage 122b) ranges from 0.6 mm to 2.4 mm. Specifically, the width of the first flow passage 122a may be 0.6 mm, 0.7 mm, 0.8 mm, 0.9 mm, 1.0 mm, 1.1 mm, 1.5 mm, 1.6 mm, 1.7 mm, 1.9 mm, 2.0 mm, 2.1 mm, 2.2 mm, 2.3 mm, 2.4 mm, and the like. The width of the second flow passage 122b may be 0.6 mm, 0.7 mm, 0.8 mm, 0.9 mm, 1.0 mm, 1.1 mm, 1.5 mm, 1.6 mm, 1.7 mm, 1.9 mm, 2.0 mm, 2.1 mm, 2.2 mm, 2.3 mm, 2.4 mm, and the like.

Optionally, a depth of the first flow passage 122a (i.e., a depth of the recess of the first flow passage 122a) ranges from 0.2 mm to 2.8 mm, and a depth of the second flow passage 122b (i.e., a depth of the recess of the second flow passage 122b) ranges from 0.2 mm to 2.8 mm. Specifically, the depth of the first flow passage 122a may be 0.2 mm, 0.5 mm, 0.6 mm, 0.8 mm, 0.9 mm, 1.0 mm, 1.1 mm, 1.2 mm, 1.6 mm, 1.9 mm, 2.1 mm, 2.2 mm, 2.5 mm, 2.6 mm, 2.8 mm, and the like. The depth of the second flow passage 122b may be 0.2 mm, 0.5 mm, 0.6 mm, 0.8 mm, 0.9 mm, 1.0 mm, 1.1 mm, 1.2 mm, 1.6 mm, 1.9 mm, 2.1 mm, 2.2 mm, 2.5 mm, 2.6 mm, 2.8 mm, and the like.

Figure 10:
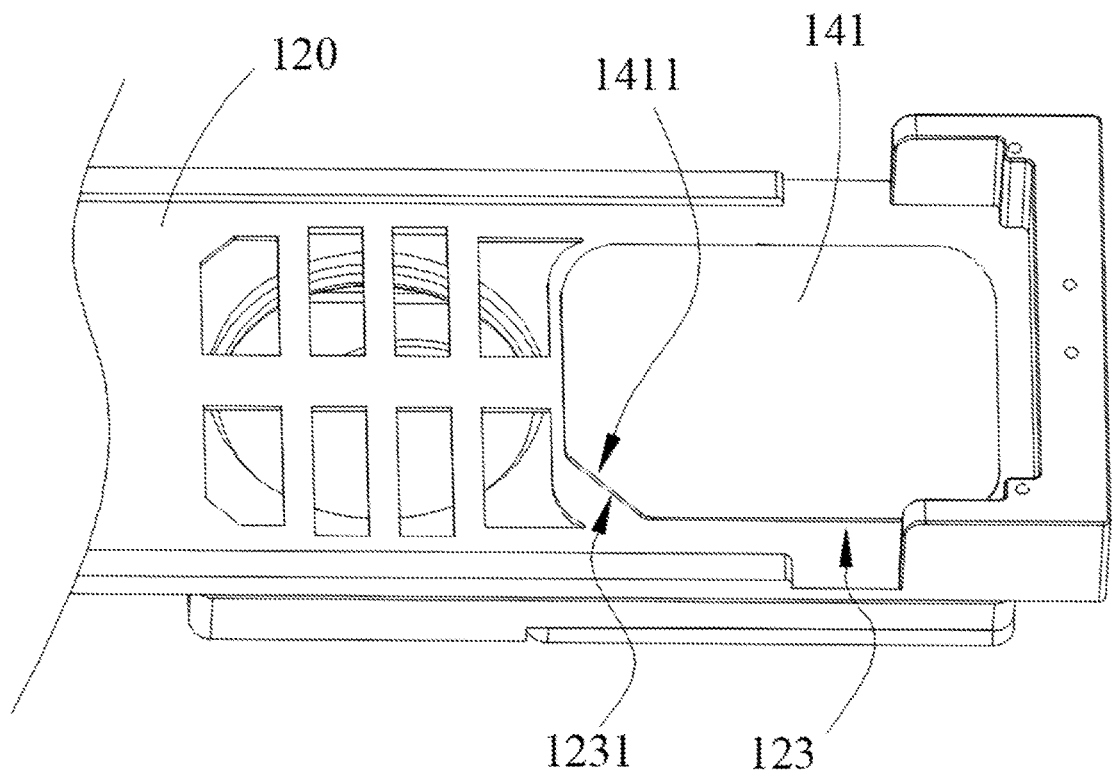
FIG. 10 is a schematic diagram illustrating assembly of a terminal post and a lower plastic member of the end cover assembly in FIG. 3.

As illustrated in FIG. 10, the flange portion 141 is provided with a fool-proof portion 1411, and the accommodating recess 123 is provided with a fitting portion 1231 matching the fool-proof portion 1411. In this embodiment, to ensure quick and correct mounting of the terminal post 140, the flange portion 141 is provided with the fool-proof portion 1411, the accommodating recess 123 is correspondingly provided with the fitting portion 1231, and the fool-proof portion 1411 matches the fitting portion 1231. During assembly, an operator only need to align and assemble the fool-proof portion 1411 and the fitting portion 1231, thereby achieving a convenient and quick assembly, and ensuring that the terminal post 140 is not misaligned with the lower plastic member 120 after assembly. The fool-proof portion 1411 may be disposed at any position of a peripheral edge of the flange portion 141, for example, a side edge or a corner of the flange portion 141. The fool-proof portion 1411 may be a protrusion or a notch on the flange portion 141. Regardless of the form of the fool-proof portion 1411, the fitting portion 1231 is set to be in a shape that can mate with the fool-proof portion 1411. In this embodiment, with the aid of the fool-proof portion 1411 and the fitting portion 1231, at least the following two beneficial effects may be brought about. On the one hand, the terminal post 140 is precisely limited. On the other hand, the sealing performance of mating between the terminal post 140 and the lower plastic member 120 is further enhanced.

Further, the lower plastic member 120 has a first surface 124 serving as a side surface of the accommodating recess 123 and abutting against the flange portion 141 of the terminal post 140. This arrangement can further enhance the sealing performance of mating between the terminal post 140 and the lower plastic member 120.

Figure 11:
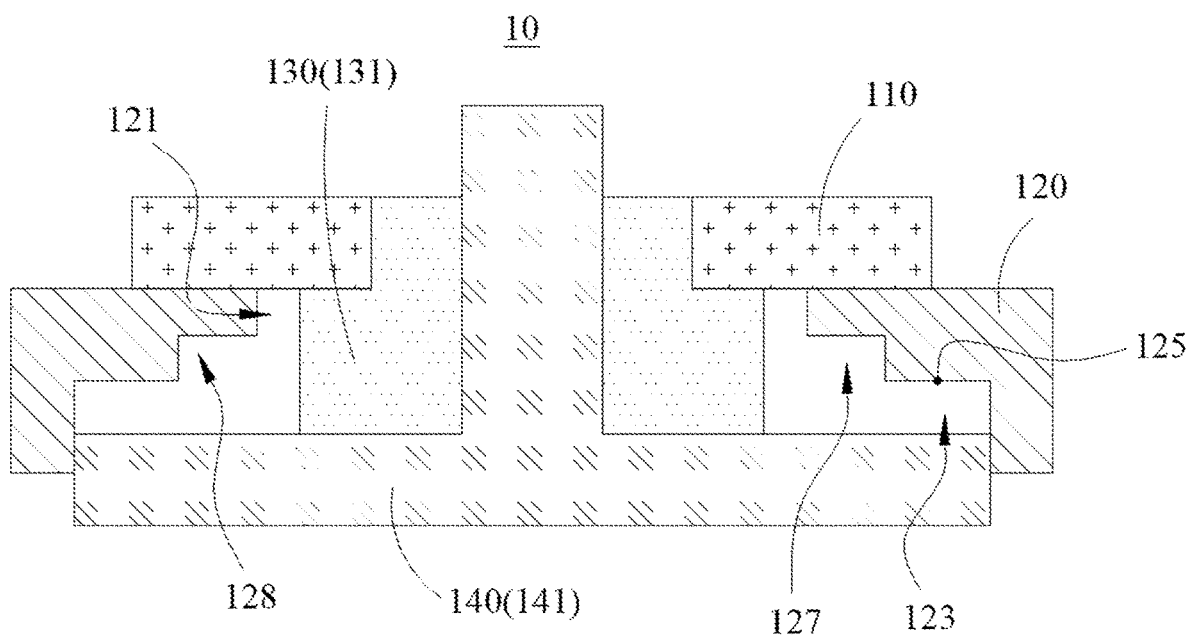
FIG. 11 is a schematic diagram illustrating an end cover assembly in a non-sealed state according to another embodiment of the disclosure.
Figure 12:
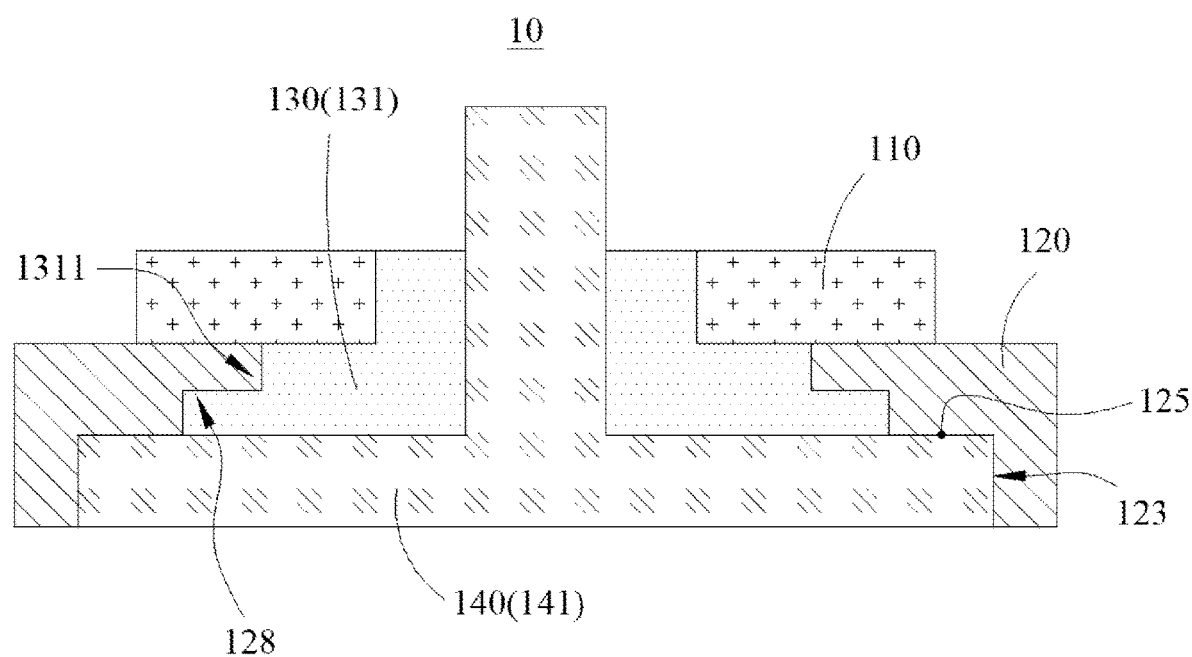
FIG. 12 is a schematic diagram illustrating an end cover assembly in a sealed state according to another embodiment of the disclosure.

As illustrated in FIGS. 11 and 12, the lower plastic member 120 has a second surface 125 facing away from the top cover 110. A part of the second surface 125 is defined as a bottom surface of the accommodating recess 123. That is, a part of the second surface 125 serves as the bottom surface of the accommodating recess 123. The lower plastic member 120 further defines a recess 127 recessed from the second surface 125. The recess 127 surrounds the hollow hole 121 and is in communication with the hollow hole 121. That is, the recess 127 is annular. When the end cover assembly 10 is in the non-sealing state, the first sealing portion 131 is positioned outside the recess 127. When the end cover assembly 10 is in the sealing state, at least part of the first sealing portion 131 is positioned in the recess 127.

Specifically, because the lower plastic member 120 defines the recess 127, a step structure (defined as a first step structure 128 herein) is formed at a position where the recess 127 is positioned. During expansion of the first sealing portion 131 in the radial direction of the first sealing portion 131 (namely, during switch of the end cover assembly 10 from the non-sealing state to the sealing state), the outer periphery of the first sealing portion 131 gradually enters the recess 127 from the hollow hole 121, and gradually compresses the first step structure 128 on the lower plastic member 120. The outer periphery of the first sealing portion 131 will also form a step structure (defined as a second step structure 1311 herein) under continuous compression. The second step structure 1311 and the first step structure 128 have the same shape and are stacked to form a fitting state, as illustrated in FIG. 12. It may be understood that, the tight fitting state of the first step structure 128 and the second step structure 1311 can further enhance the sealing performance. In addition, the step structure can also increase a creep age distance, thereby improving the safety performance of the energy storage apparatus 100.

In summary, with the aid of the recess 127, at least the following two beneficial effects can be brought about. On the one hand, the recess 127 enables an abutting surface between the outer peripheral wall of the first sealing portion 131 and the inner peripheral wall of the hollow hole 121 of the sealing member 130 to be extended into a Z-shape, increasing a contact area between the outer peripheral wall of the first sealing portion 131 and the inner peripheral wall of the hollow hole 121 of the lower plastic member 120, and further enhancing the sealing effect. On the other hand, the creep age distance between the flange portion 141 of the terminal post and the top cover 110 is increased, thereby improving the electrical safety performance.

As illustrated in FIG. 7, the first flow passage 122a is recessed from the second surface 125. One end of the first flow passage 122a is in communication with the recess 127, and another end of the first flow passage 122a is in communication with the second flow passage 122b.

As illustrated in FIGS. 8 and 9, when the sealing member 130 is assembled in the hollow hole 121 of the lower plastic member 120 and is not compressed (as illustrated in FIG. 8), a gap is defined between an outer peripheral surface of the first sealing portion 131 and a side surface of the hollow hole 121. The lower plastic member 120 has a second surface 125 and a third surface 126 that abuts against a surface of the top cover 110. A part of the second surface 125 serves as a bottom surface of the accommodating recess 123. A distance between the second surface 125 and the third surface 126 is H2, and a thickness of the first sealing portion 131 is H1, and H1 is greater than H2. That is, the first sealing portion 131 protrudes from the second surface 125 in a direction from the third surface 126 to the second surface 125. Here, the thickness of the first sealing portion 131 refers to a size of the first sealing portion 131 in the opposite direction of the second surface 125 and the third surface 126.

During mating of the sealing member 130 with the hollow hole 121 of the lower plastic member 120 and compression of the first sealing portion 131 by the flange portion 141 of the terminal post 140, the thickness H1 of the first sealing portion 131 decreases, and the first sealing portion 131 expands in the radial direction of the first sealing portion 131. The gap between the outer periphery of the first sealing portion 131 and the side wall of the hollow hole 121 is gradually filled by the first sealing portion 131, until the seal assembly as illustrated in FIG. 9 is achieved.

In this embodiment, since H1 is greater than H2, it can be ensured that the terminal post 140 can compress the first sealing portion 131 in the thickness direction of the first sealing portion 131 during assembly, so that adjacent components are in close contact with each other, thereby improving sealing performance.

During assembly of the end cover assembly 10, when the flange portion 141 of the terminal post 140 is just inserted into the accommodating recess 123, a space defined by the flange portion 141 of the terminal post 140, the first sealing portion 131 of the sealing member 130, the lower plastic member 120, and the top cover 110 is relatively closed, and the space is simply referred to as a closed space (see FIG. 11). The flange portion 141 is continue moved upward to compress the first sealing portion 131, and the first sealing portion 131 is compressed to be thinner and expand outwards, the gap between the outer peripheral wall of the first sealing portion 131 and the inner peripheral wall of the hollow hole 121 is closed (see FIG. 12), and air in the gap and air in the closed space can be smoothly expelled through the first flow passage 122a and the second flow passage 122b. In this way, no air bubble will form in the closed space, thereby enhancing the sealing performance between the terminal post 140 and the top cover 110, and further improving the durability of the energy storage apparatus 100.

Alternatively, a reduction in the thickness of the first sealing portion 131 subject to compression is (H1−H2), and a size of the gap between the outer peripheral surface of the first sealing portion 131 and the side surface of the hollow hole 121 is H3, where $0.9 \leq (H1-H2)/H3 \leq 1.6$. That is, a ratio of (H1−H2) to H3 ranges from 0.9 to 1.6. With this arrangement, it can be ensured that the first sealing portion 131 can expand outwards under compression to fill the gap and abut against the side surface of the hollow hole 121, thereby further enhancing the sealing performance. The ratio of (H1−H2) to H3 can be, but is not limited to, 0.9, 1.0, 1.1, 1.2, 1.25, 1.3, 1.4, 1.5, 1.6, etc.

Optionally, the thickness H1 of the first sealing portion 131, when not compressed, ranges from 0.8 mm to 3 mm. Specifically, the thickness H1 of the first sealing portion 131, when not compressed, may be 0.8 mm, 0.9 mm, 1.0 mm, 1.1 mm, 1.15 mm, 1.2 mm, 1.5 mm, 1.8 mm, 2.0 mm, 2.3 mm, 2.5 mm, 2.6 mm, 2.9 mm, 3.0 mm, and the like.

Alternatively, the size of the gap H3 between the outer peripheral surface of the first sealing portion 131 and the side surface of the hollow hole 121 ranges from 0.05 mm to 1.85 mm. Specifically, the size of the gap H3 may be 0.05 mm, 0.06 mm, 0.10 mm, 0.15 mm, 0.20 mm, 0.26 mm, 0.3 mm, 0.41 mm, 0.5 mm, 0.55 mm, 0.6 mm, 0.9 mm, 1.5 mm, 1.85 mm, and the like. If H3<0.05 mm, the first sealing portion 131 may not sufficiently expand in the radial direction, so that the first sealing portion 131 cannot be further compressed by the flange portion 141, finally resulting in a poor sealing effect. If H3>1.85, H3 may be still greater than zero when the end cover assembly 10 is in the sealed state, that is, the side wall of the hollow hole 121 and an edge of the first sealing portion 131 will not abut against each other, resulting in a poor sealing effect.

Although the embodiments of the disclosure have been illustrated and described, it may be understood that the above embodiments are illustrative and cannot be construed as limitations to the disclosure. Those skilled in the art can make changes, modifications, replacements, and variations to the above embodiments within the scope of the disclosure, and these changes and modifications shall also belong to the scope of protection of the disclosure.

What is claimed is:

1. An end cover assembly, comprising:
   a top cover;
   a lower plastic member, wherein the lower plastic member is fixed to the top cover and defines a hollow hole and a first flow passage, the hollow hole extends through the lower plastic member in a direction from the lower plastic member to the top cover, one end of the first flow passage is in communication with a side wall of the hollow hole, and another end of the first flow passage is in communication with an outside;

a sealing member comprising a first sealing portion disposed in the hollow hole; and a terminal post comprising a flange portion, wherein the flange portion is disposed on one side of the first sealing portion facing away from the top cover and covers the first sealing portion, the flange portion and the top cover cooperatively compress the first sealing portion, and the flange portion is insulated and separated from the top cover by the lower plastic member;

wherein the lower plastic member further defines a second flow passage, one end of the second flow passage is in communication with the first flow passage, and another end of the second flow passage is in communication with the outside, the second flow passage is connected to the first flow passage in a bent manner, and the first flow passage is curvedly connected to the second flow passage.

2. The end cover assembly of claim 1, wherein a recess in communication with the hollow hole is defined at an edge of the hollow hole to serve as the first flow passage.

3. The end cover assembly of claim 1, wherein the lower plastic member has an end surface facing away from the top cover and further defines an accommodating recess, the accommodating recess is recessed from the end surface and in communication with the hollow hole, and the flange portion is received in the accommodating recess.

4. The end cover assembly of claim 3, wherein the lower plastic member has a first surface, the first surface serves as a side surface of the accommodating recess, and the second flow passage is defined on the first surface.

5. The end cover assembly of claim 3, wherein: the flange portion is provided with a fool-proof portion, and the accommodating recess is provided with a fitting portion matching the fool-proof portion; and the lower plastic member has a first surface serving as a side surface of the accommodating recess and abutting against the flange portion of the terminal post.

6. The end cover assembly of claim 3, wherein the lower plastic member has a second surface, a part of the second surface serves as a bottom surface of the accommodating recess, the lower plastic member further defines a recess recessed from the second surface, and the recess is annular and is in communication with the hollow hole to form a step structure.

7. The end cover assembly of claim 6, wherein the first flow passage is recessed from the second surface and is in communication with the recess.

8. The end cover assembly of claim 3, wherein when the sealing member is assembled in the hollow hole of the lower plastic member and is not compressed, a gap is defined between an outer peripheral surface of the first sealing portion and a side surface of the hollow hole, a thickness of the first sealing portion is H1, the lower plastic member has a second surface and a third surface that abuts against a surface of the top cover, a part of the second surface serves as a bottom surface of the accommodating recess, and a distance between the second surface and the third surface is H2, wherein H1 is greater than H2.

9. The end cover assembly of claim 8, wherein a reduction in a thickness of the first sealing portion subject to compression deformation is H1−H2, and a size of the gap between the outer peripheral surface of the first sealing portion and the side surface of the hollow hole is H3, wherein $0.9 \leq (H1-H2)/H3 \leq 1.6$.

10. The end cover assembly of claim 8, wherein the thickness H1 of the first sealing portion ranges from 0.8 mm to 3 mm.

11. The end cover assembly of claim 8, wherein the size of the gap between the outer peripheral surface of the first sealing portion and the side surface of the hollow hole ranges from 0.05 mm to 1.85 mm.

12. The end cover assembly of claim 1, further comprising a metal block, wherein the metal block is disposed on one side of the top cover facing away from the lower plastic member, the top cover defines a through hole facing towards the hollow hole, the terminal post further comprises a post body protruding from one side of the flange portion, and one end of the post body facing away from the flange portion extends through the through hole to connect to the metal block.

13. The end cover assembly of claim 12, wherein the sealing member further comprises a second sealing portion protruding from one side of the first sealing portion, and the second sealing portion extends through the through hole and is sleeved on an outer periphery of the post body.

14. An energy storage apparatus comprising an electrode assembly, a housing, and an end cover assembly, wherein the end cover assembly comprises:

a top cover;

a lower plastic member, wherein the lower plastic member is fixed to the top cover and defines a hollow hole and a first flow passage, the hollow hole extends through the lower plastic member in a direction from the lower plastic member to the top cover, one end of the first flow passage is in communication with a side wall of the hollow hole, and another end of the first flow passage is in communication with an outside;

a sealing member comprising a first sealing portion disposed in the hollow hole; and a terminal post comprising a flange portion, wherein the flange portion is disposed on one side of the first sealing portion facing away from the top cover and covers the first sealing portion, the flange portion and the top cover cooperatively compress the first sealing portion, and the flange portion is insulated and separated from the top cover by the lower plastic member;

wherein the lower plastic member further defines a second flow passage, one end of the second flow passage is in communication with the first flow passage, and another end of the second flow passage is in communication with the outside, the second flow passage is connected to the first flow passage in a bent manner, and the first flow passage is curvedly connected to the second flow passage; and the electrode assembly is received in the housing, and the end cover assembly is electrically connected to the electrode assembly.

15. The energy storage apparatus of claim 14, wherein a recess in communication with the hollow hole is defined at an edge of the hollow hole to serve as the first flow passage.

16. The energy storage apparatus of claim 14, wherein the lower plastic member has an end surface facing away from the top cover and further defines an accommodating recess, the accommodating recess is recessed from the end surface and in communication with the hollow hole, and the flange portion is received in the accommodating recess.

17. The energy storage apparatus of claim 16, wherein the lower plastic member has a first surface, the first surface serves as a side surface of the accommodating recess, the second flow passage is defined on the first surface.

18. An electricity-consumption device comprising an energy storage apparatus being configured to power the electricity-consumption device and comprising an electrode assembly, a housing, and an end cover assembly, wherein the end cover assembly comprises:

a top cover;

a lower plastic member, wherein the lower plastic member is fixed to the top cover and defines a hollow hole and a first flow passage, the hollow hole extends through the lower plastic member in a direction from the lower plastic member to the top cover, one end of the first flow passage is in communication with a side wall of the hollow hole, and another end of the first flow passage is in communication with an outside;

a sealing member comprising a first sealing portion disposed in the hollow hole; and a terminal post comprising a flange portion, wherein the flange portion is disposed on one side of the first sealing portion facing away from the top cover and covers the first sealing portion, the flange portion and the top cover cooperatively compress the first sealing portion, and the flange portion is insulated and separated from the top cover by the lower plastic member;

wherein the lower plastic member further defines a second flow passage, one end of the second flow passage is in communication with the first flow passage, and another end of the second flow passage is in communication with the outside, the second flow passage is connected to the first flow passage in a bent manner, and the first flow passage is curvedly connected to the second flow passage; and wherein the electrode assembly is received in the housing, and the end cover assembly is electrically connected to the electrode assembly.

19. The energy storage apparatus of claim 1, wherein the lower plastic member has a first surface and a second surface connected to and surround by the first surface, the first flow passage is defined on the second surface, and the second flow passage is defined on the first surface.

20. The electricity-consumption device of claim 18, wherein the lower plastic member has a first surface and a second surface connected to and surround by the first surface, the first flow passage is defined on the second surface, and the second flow passage is defined on the first surface.

* * * * *